United States Patent
Mekala

(10) Patent No.: US 7,625,833 B2
(45) Date of Patent: Dec. 1, 2009

(54) METHOD OF MAKING A MEMBRANE ELECTRODE ASSEMBLY

(75) Inventor: David R. Mekala, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 85 days.

(21) Appl. No.: 11/618,115

(22) Filed: Dec. 29, 2006

(65) Prior Publication Data

US 2007/0155615 A1   Jul. 5, 2007

Related U.S. Application Data

(60) Provisional application No. 60/743,084, filed on Dec. 29, 2005.

(51) Int. Cl.
  *H01M 4/88* (2006.01)
  *B32B 38/04* (2006.01)
(52) U.S. Cl. .......................... 502/101; 156/263
(58) Field of Classification Search ............ None
  See application file for complete search history.

(56) References Cited

U.S. PATENT DOCUMENTS

| | | | |
|---|---|---|---|
| 6,197,147 B1 | 3/2001 | Bonsel et al. | |
| 7,087,339 B2 * | 8/2006 | Wald et al. | 429/36 |
| 2003/0191021 A1 * | 10/2003 | Ripley et al. | 502/439 |
| 2003/0224233 A1 * | 12/2003 | Kohler et al. | 429/30 |
| 2005/0263246 A1 * | 12/2005 | Yandrasits et al. | 156/307.3 |

FOREIGN PATENT DOCUMENTS

WO   WO 2005/011041 A1   2/2005

* cited by examiner

*Primary Examiner*—Melvin C Mayes
*Assistant Examiner*—Sarah Van Oudenaren
(74) *Attorney, Agent, or Firm*—Philip Y. Dahl

(57) ABSTRACT

A method of making a five-layer membrane electrode assembly is provided which includes the steps of: providing a catalyst coated membrane web; providing a laminating station wherein the catalyst coated membrane web is drawn between a pair of laminating rollers which form a laminating nip; die-cutting first and second webs of gas diffusion layer material to make first and second gas diffusion layers; feeding first and second gas diffusion layers into the laminating nip adjacent to the catalyst coated membrane web; and laminating the first gas diffusion layer, catalyst coated membrane web and second gas diffusion layer to form a laminate.

6 Claims, 1 Drawing Sheet

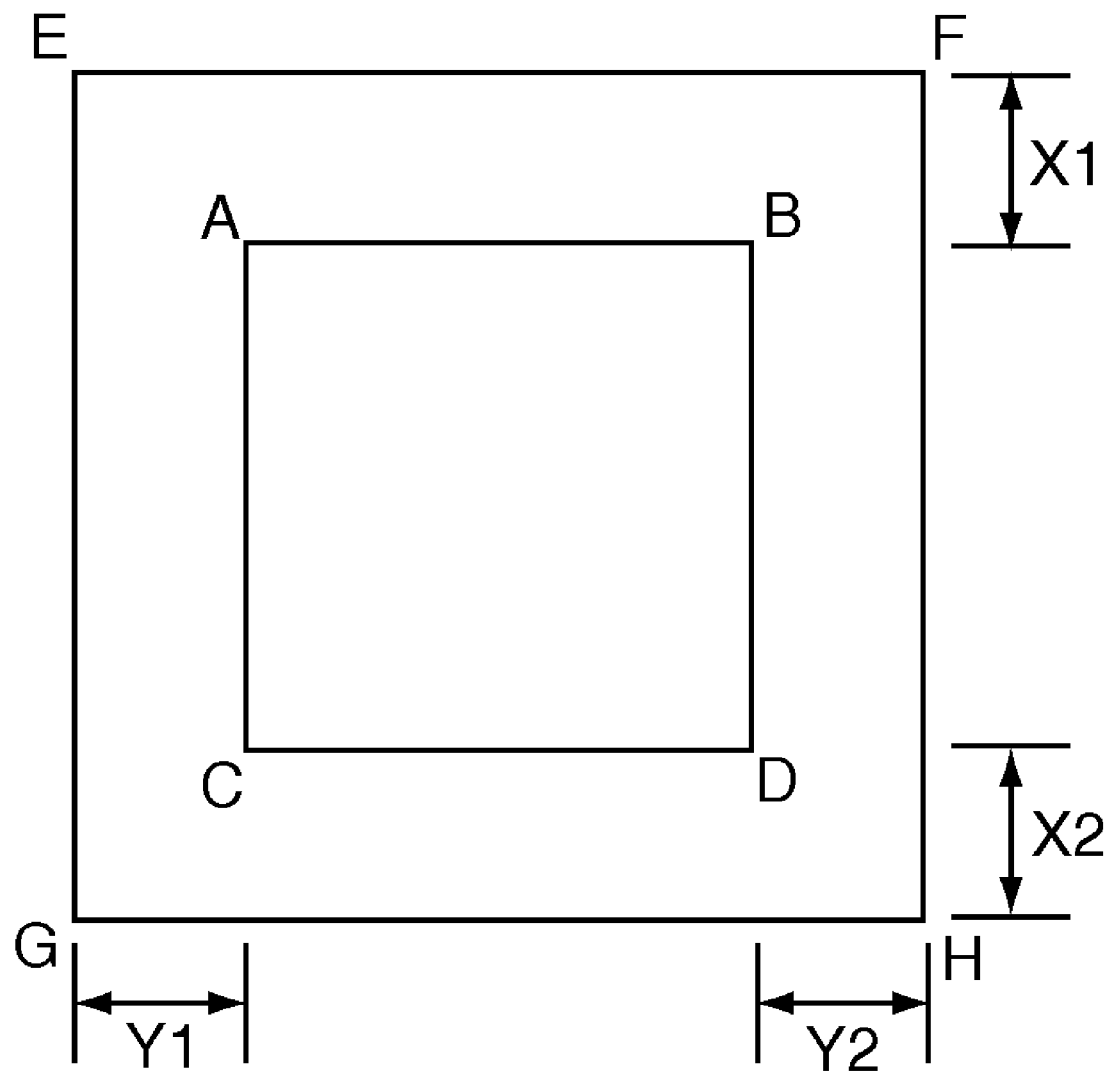

METHOD OF MAKING A MEMBRANE ELECTRODE ASSEMBLY

CROSS REFERENCE TO RELATED APPLICATION

This application claims the benefit of U.S. Provisional Patent Application No. 60/743,084, filed Dec. 29, 2005, the disclosure of which is incorporated by reference herein in its entirety.

FIELD OF THE INVENTION

This invention relates to methods of attaching a gas diffusion layer (GDL) to a catalyst coated membrane (CCM) to make a five-layer membrane electrode assembly (MEA) such as an MEA used in a fuel cell.

BACKGROUND OF THE INVENTION

U.S. Pat. No. 6,197,147 B1 purportedly discloses a process for producing laminates.

US 2003/0191021 A1, incorporated herein by reference, discloses lamination apparatus and methods relating to the production of membrane electrode assemblies.

SUMMARY OF THE INVENTION

Briefly, the present disclosure provides a method of making a five-layer membrane electrode assembly comprising the steps of: a) providing a catalyst coated membrane web which comprises: 1) a polymer electrolyte membrane having a first and second face; 2) a plurality of first patterned catalyst layer segments laminated on said first face of said membrane such that adjacent patterned catalyst layer segments are not in contact with each other; and 3) a plurality of second patterned catalyst layer segments laminated on said second face of said membrane such that adjacent patterned catalyst layer segments are not in contact with each other; b) providing a laminating station wherein the catalyst coated membrane web is drawn between a pair of laminating rollers which form a laminating nip; c) die-cutting a first web of first gas diffusion layer material to make a first gas diffusion layer; d) die-cutting a second web of second gas diffusion layer material to make a second gas diffusion layer; e) transporting the first gas diffusion layer to the laminating station; f) transporting the second gas diffusion layer to the laminating station; g) feeding the first gas diffusion layer into the laminating nip adjacent to the catalyst coated membrane web; h) feeding the second gas diffusion layer into the laminating nip adjacent to the catalyst coated membrane web concurrently with the first gas diffusion layer; and i) laminating the first gas diffusion layer, the catalyst coated membrane web and the second gas diffusion layer to form a laminate. The method may additionally comprise the step of: j) repeating steps a)-i) to form a continuous web comprising multiple five-layer membrane electrode assemblies. Typically, the first gas diffusion layer has an area greater than the first patterned catalyst layer segments. Typically, the second gas diffusion layer has an area greater than the second patterned catalyst layer segments.

In this application:

"to laminate" means to bond together two or more sheet materials; and

"five-layer membrane electrode assembly" means a construction comprising at least five layers, including a gas diffusion layers layer, a catalyst layer, a layer of a polymer electrolyte membrane, another catalyst layer, and. another gas diffusion layer; and "gas diffusion layers" (GDL's) may include layers previously termed "diffuser/current collector" (DCC) layers, "fluid transport layers" (FTL's), or "electrode backing layers" (EBL's).

BRIEF DESCRIPTION OF THE DRAWING

The FIGURE is a schematic top view demonstrating positioning, prior to roll bonding, of a gas diffusion layer (EFGH) and the catalyst area of a catalyst coated membrane (ABCD), as described further herein.

DETAILED DESCRIPTION

This invention relates to methods of attaching a gas diffusion layer (GDL) to a catalyst coated membrane (CCM) to make a membrane electrode assembly (MEA) such as an MEA used in a fuel cell. The method of the present invention includes roll-bonding of the GDL to the CCM, and typically simultaneous roll-bonding of two GDL pieces to the CCM, one to each side. In addition, the method may include the step of overlaying the GDL piece(s) corners at specified locations on top of the CCM piece prior to roll bonding. In addition, the method may include a prior step of transporting the GDL piece(s) from a die station to a roll-bonding station, typically by use of a vacuum belt in order to maintain registration. In addition, the method may include a prior step of die-cutting GDL piece(s) from a sheet or roll of GDL material, more typically a roll. The method of the present invention may be carried out using apparatus such as that disclosed in US 2003/0191021 A1, incorporated herein by reference. The method of the present invention may be carried out method details disclosed in US 2003/0191021 A1.

In some embodiments, the GDL piece(s) may be positioned relative to the CCM piece and relative to each other with the use of sensors, such as laser sensors. The relative speed of the CCM web and the transport devices feeding one or both GDL's can be adjusted relative to each other such that the center of the GDL piece on both sides of the CCM web is at the same center point of the CCM.

In one embodiment of the present invention, the CCM comprises catalyst areas, where the membrane bears a catalyst coating, and non-catalyst areas, where the membrane is bare. It has been found that the GDL adheres better to bare membrane areas than to the catalyst area of the CCM. With reference to the figure, the quadrilateral EFGH represents a GDL piece and the quadrilateral ABCD represents the catalyst area of a CCM. With reference to the figure, the following parameters have been found to maximize physical adhesion between the GDL piece and the CCM piece, which results in improved MEA performance in a fuel cell. In various embodiments of the present invention, one or more of the following parameters is controlled, typically on a continuing basis during production.

Parameter 1: Top edge EF of the GDL piece is maintained in parallel to the top edge AB of the CCM catalyst area.

Parameter 2: Bottom edge GH of the GDL piece is maintained in parallel to the bottom edge CD of the CCM catalyst area.

Parameter 3: Side edge EG of the GDL piece is maintained in parallel to side edge AC of the CCM catalyst area.

Parameter 4: Side edge FH of the GDL piece is maintained in parallel to side edge BD of the CCM catalyst area.

Parameter 5: Top and bottom overhangs are maintained in equality, i.e., X1=X2.

Parameter 6: Side overhangs are maintained in equality, i.e., Y1=Y2.

Parameter 7: All overhangs are maintained in equality, i.e., X1=X2=Y1=Y2.

It has been found that physical adhesion of the GDL to the CCM is directly proportion to GDL overhang.

Various modifications and alterations of this invention will become apparent to those skilled in the art without departing from the scope and principles of this invention, and it should be understood that this invention is not to be unduly limited to the illustrative embodiments set forth hereinabove.

I claim:

1. A method of making a five-layer membrane electrode assembly comprising the steps of:
   a) providing a catalyst coated membrane web which comprises:
      1) a polymer electrolyte membrane having a first and second face;
      2) a plurality of first patterned catalyst layer segments laminated on said first face of said membrane such that adjacent patterned catalyst layer segments are not in contact with each other; and
      3) a plurality of second patterned catalyst layer segments laminated on said second face of said membrane such that adjacent patterned catalyst layer segments are not in contact with each other;
   b) providing a laminating station wherein said catalyst coated membrane web is drawn between a pair of laminating rollers which form a laminating nip;
   c) die-cutting a first web of first gas diffusion layer material to make a first gas diffusion layer;
   d) die-cutting a second web of second gas diffusion layer material to make a second gas diffusion layer;
   e) transporting said first gas diffusion layer to said laminating station;
   f) transporting said second gas diffusion layer to said laminating station;
   g) feeding said first gas diffusion layer into said laminating nip adjacent to said catalyst coated membrane web;
   h) feeding said second gas diffusion layer into said laminating nip adjacent to said catalyst coated membrane web concurrently with said first gas diffusion layer; and
   i) laminating said first gas diffusion layer, said catalyst coated membrane web and said second gas diffusion layer to form a laminate;
   wherein the first gas diffusion layer has an area greater than the first patterned catalyst layer segments.

2. The method according to claim 1 wherein the second gas diffusion layer has an area greater than the second patterned catalyst layer segments.

3. The method according to claim 1 additionally comprising the steps of:
   j) repeating steps a)-i) to form a continuous web comprising multiple five-layer membrane electrode assemblies.

4. The method according to claim 2 additionally comprising the steps of:
   j) repeating steps a)-i) to form a continuous web comprising multiple five-layer membrane electrode assemblies.

5. The method according to claim 1 wherein said first patterned catalyst layer segment has a top edge and a bottom edge and wherein said first gas diffusion layer has a top edge and a bottom edge, and wherein the top edge of the first gas diffusion layer overhangs the top edge of the first patterned catalyst layer segment by the same amount that the bottom edge of the first gas diffusion layer overhangs the bottom edge of the first patterned catalyst layer segment in the five-layer membrane electrode assembly.

6. The method according to claim 5 wherein said first patterned catalyst layer segment has two side edges and wherein said first gas diffusion layer has two side edges, and wherein all of the top, bottom and side edges of the first gas diffusion layer overhang the corresponding edges of the first patterned catalyst layer segment by the same amount in the five-layer membrane electrode assembly.

* * * * *